Figure 1:
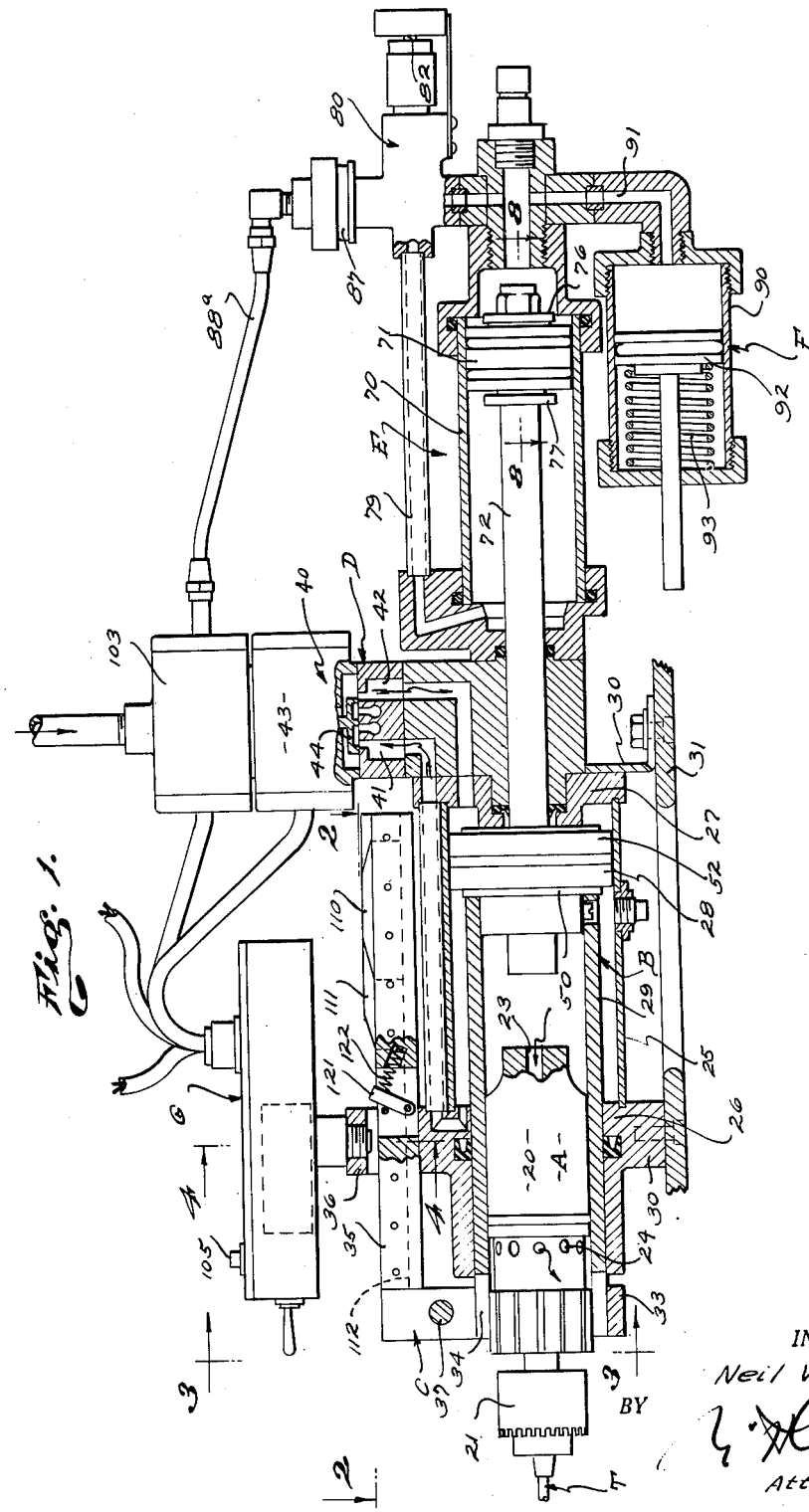

July 29, 1952 N. V. SMITH 2,604,759
FLUID PRESSURE ACTUATED TOOL DRIVING AND FEEDING EQUIPMENT
Filed March 20, 1951 3 Sheets-Sheet 1

INVENTOR.
Neil V. Smith
BY
Attorney

July 29, 1952  N. V. SMITH  2,604,759
FLUID PRESSURE ACTUATED TOOL DRIVING AND FEEDING EQUIPMENT
Filed March 20, 1951  3 Sheets-Sheet 2
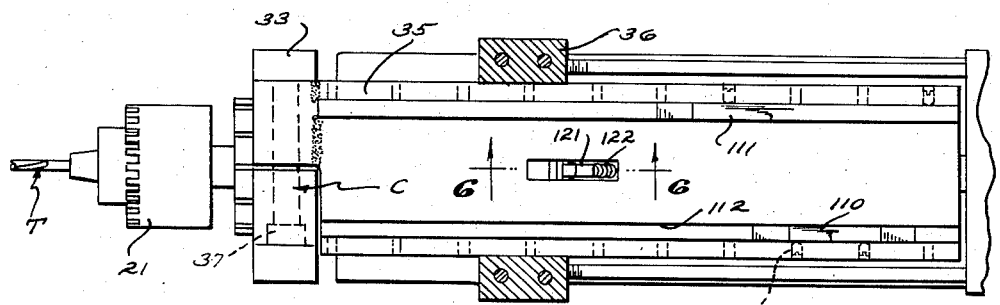
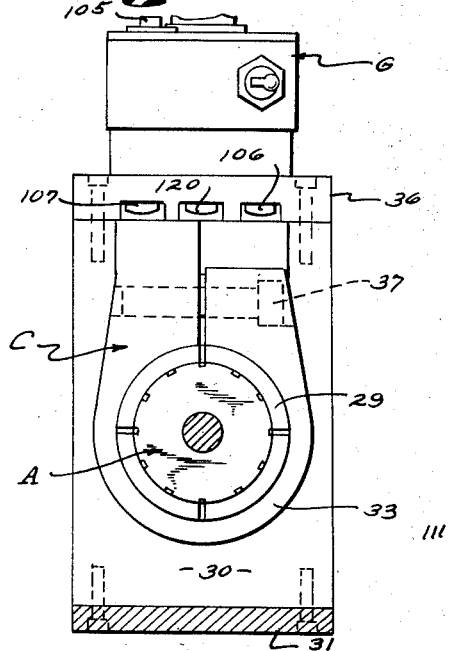
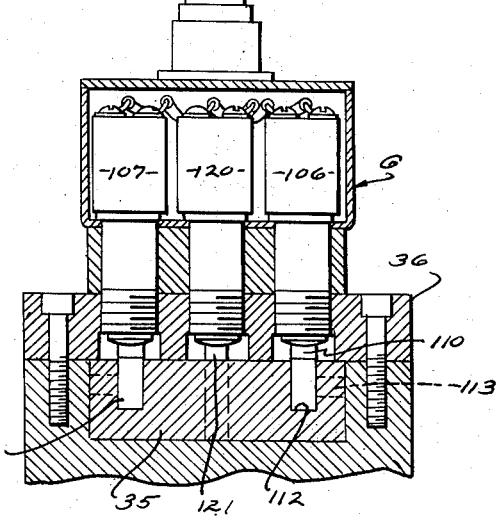
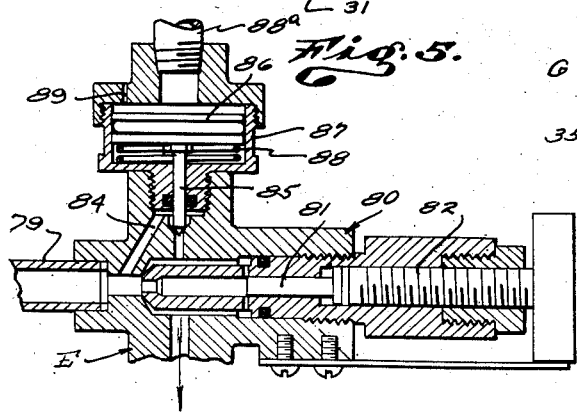
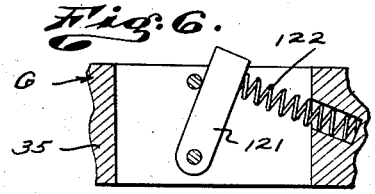
INVENTOR.
Neil V. Smith
BY
Attorney July 29, 1952 N. V. SMITH 2,604,759
FLUID PRESSURE ACTUATED TOOL DRIVING AND FEEDING EQUIPMENT
Filed March 20, 1951 3 Sheets-Sheet 3
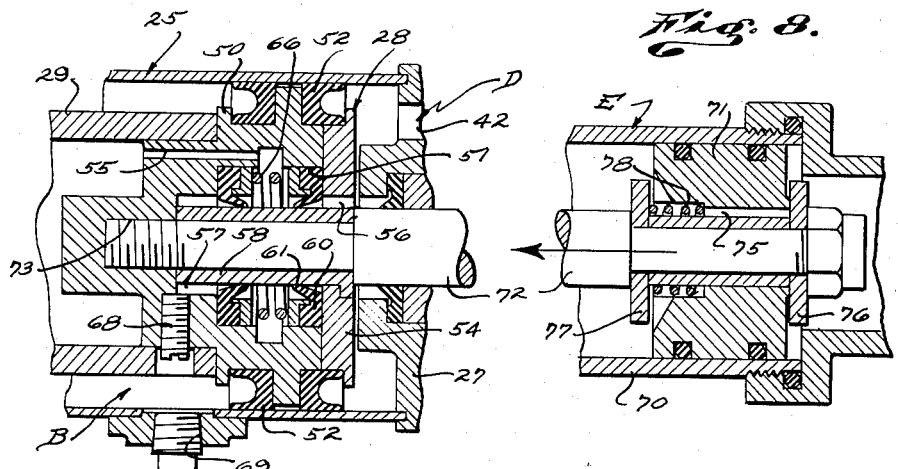
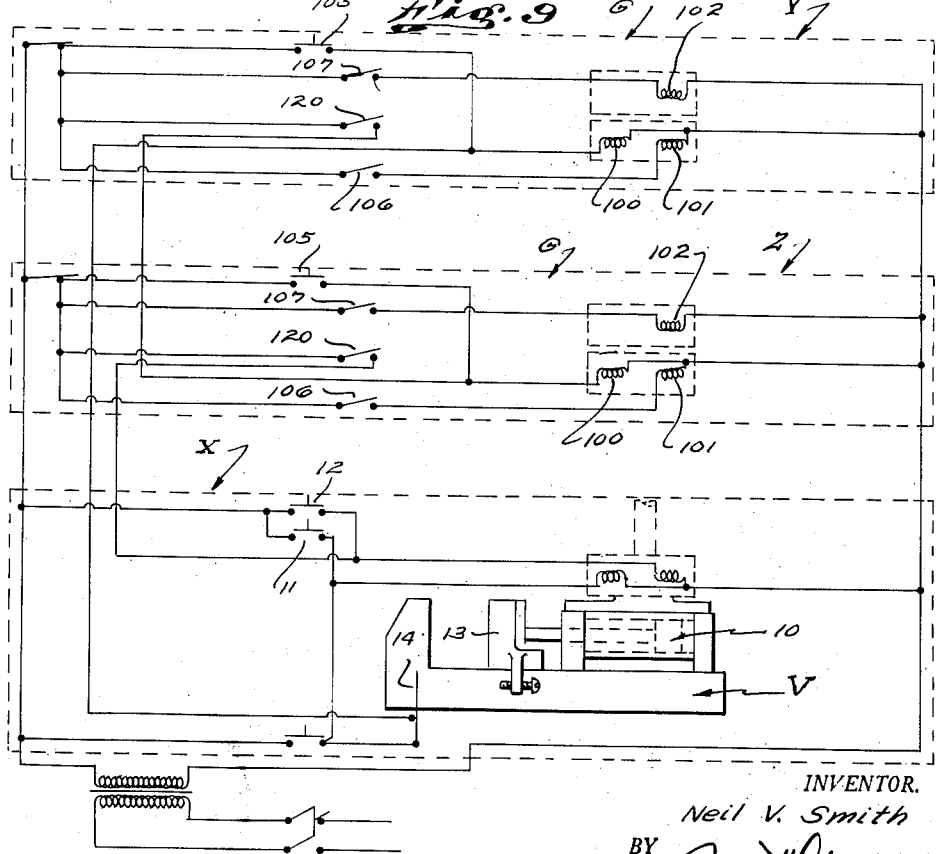
INVENTOR.
Neil V. Smith
BY
Attorney Patented July 29, 1952

2,604,759

UNITED STATES PATENT OFFICE 2,604,759

FLUID PRESSURE ACTUATED TOOL DRIVING AND FEEDING EQUIPMENT

Neil V. Smith, Los Angeles, Calif.

Application March 20, 1951, Serial No. 216,528

16 Claims. (Cl. 60—97)

This invention has to do with fluid pressure actuated tool operating equipment and it is a general object of the invention to provide equipment of the character mentioned which is simple and dependable in operation and is such that it can be readily adapted or accommodated to various operations such as are required in the course of carrying out various machine operations.

A general object of the invention is to provide a mechanism of the general character referred to wherein a tool operating motor is carried by a stem projecting from the piston of a cylinder and piston mechanism and wherein the said motor is operated or driven by fluid employed in the operation of the said mechanism.

It is another object of the invention to provide a structure of the general character referred to which provides for ready conversion of the structure so that the motor operates when the piston of the mechanism operates in one direction only, or the motor operates when the piston of the mechanism operates in either direction.

Another object of the invention is to provide apparatus of the general character referred to in which a speed control means is provided and is under control of the element of the apparatus that shifts as the tool driven by the motor is advanced toward the work.

Another object of the invention is to provide apparatus of the general character referred to in which a plurality of units are cooperatively related so that the action of one is synchronized with that of another.

The present invention provides a plurality of cooperatively related units and in a typical situation one of these units involves a work holder or vise while one or more additional units involves a tool operating fluid actuated motor. In the general system provided by the invention each unit is provided with a trip switch connected in parallel with the starting switch of a unit which is to follow in operation, and as a result the units are cooperatively coupled to operate successively and in a predetermined sequence and in proper timed relation.

The invention provides a tool-driving motor such as an air motor, and in a typical arrangement a chuck is provided on the projecting end of the motor shaft and carries a tool such as a drill, or the like. A fluid pressure actuated means carries or mounts the motor for reciprocation and involves, essentially, a cylinder, inner and outer heads closing the ends of the cylinder, a piston operating in the cylinder and a stem connected to the piston and projecting from the cylinder through the outer head. A means is provided holding the motor against rotation and so that it is supported and operates with the stem. This means preferably includes a clamp that holds the projecting end of the stem on the motor and a head rigid with the clamp and operating in a guideway so the head moves parallel with the stem. A valve means is provided controlling the supply of operating fluid to the ends of the cylinder and includes a valve member operating in a valve body and ducts that conduct the fluid from the valve to the ends of the cylinder. The invention provides means supplying operating fluid to the motor from the cylinder and this means can be engaged so that operating fluid for the motor is supplied from one end of the cylinder or from both ends thereof. A speed control is provided governing the action of the stem and may involve a cylinder, a piston operating in the cylinder and a rod from the piston to the stem. By-pass means is provided controlling the flow of fluid in one direction in the speed control and a release means is provided in connection with the by-pass. An accumulator carries fluid under pressure as a fluid make-up means and a control means is provided for the valves included in the apparatus, the control means being essentially electric and being a starting switch adapted for manual operation and connected in parallel with the trip switch of a coordinated unit, a speed control switch and a reversing switch. The speed control switch and reversing switch are preferably cam operated, being responsive to cams operated with or by the head hereinabove referred to. A trip switch is operated from or by the head and is in parallel with the starting switch of a coordinated unit.

The various objects and features of my invention will be fully understood from the following detailed description of a typical preferred form and application of the invention, throughout which description reference is made to the accompanying drawings, in which:

Fig. 1 is a view illustrating a tool operating unit or mechanism embodying the invention, certain of the principal parts being shown in section to illustrate details of construction and to show the general arrangement and relationship of parts. Fig. 2 is a plan view taken as indicated by line 2—2 on Fig. 1. Fig. 3 is a transverse sectional view taken as indicated by line 3—3 on Fig. 1. Fig. 4 is an enlarged detailed sectional view of a portion of the mechanism, being a view taken as indicated by line 4—4 on Fig. 1. Fig. 5 is an enlarged detailed sectional view of a portion of the mechanism shown at the right in Fig. 1. Fig. 6 is an enlarged detailed sectional view taken as indicated by line 6—6 on Fig. 2. Fig. 7 is an enlarged central detailed sectional view of a portion of the mechanism shown in Fig. 1, showing the means by which air is supplied to the motor which operates the tool. Fig. 8 is an enlarged detailed sectional view of a portion of the mechanism shown in Fig. 1, showing a part of the speed control means, being a view taken as indicated by line 8—8 on Fig. 1, and Fig. 9 is a diagrammatic view illustrating the electrical circuit that may be employed in carrying out the invention.

The present invention may be employed for various operations and may be carried out in connection with various forms of equipment. In the diagram, Fig. 9, I illustrate three coordinated units, namely, a unit X which is essentially a work holding mechanism and units Y and Z which are tool operating or driving units. The present invention is not concerned with the details of unit X and it will be sufficient to note that this unit is provided with a vise V with a cylinder and piston type actuator 10 under control of an electric circuit including a starting switch 11 and a releasing switch 12. When the starting switch 11 is closed the movable element or jaw 13 of the vise is operated to grip work, whereas when switch 12 is operated the jaw 13 is retracted. A trip switch 14 is provided and is operated when the jaw 13 is operated to a predetermined position. So far as the present invention is concerned the unit X shown in the diagram and referred to above is merely a typical unit such as may be coordinated with one or more units which are essentially tool-operating mechanisms.

Units Y and Z, being tool-operating units, may be alike and they may be related to each other or to the unit X in various manners. In a typical arrangement unit X is related to unit Y so that actuation of the trip switch 14 of unit X initiates operation of unit Y and unit Y is related to unit Z so that it initiates operation of unit Z.

A unit provided by the invention, for example, either unit Y or unit Z, involves, generally, a tool-driving motor A, fluid pressure actuated means B supporting or mounting the motor A for reciprocation, means C holding the motor against rotation, means D supplying operating fluid to the motor A, speed control means E controlling action of the means B, an accumulator F supplying make-up fluid to the mechanism, and an electric system G controlling the essential working parts of the unit.

The tool driving motor A is preferably a fluid pressure actuated motor and, in practice, it is preferred that it be an air motor, in which case fluid after passing through the motor can be exhausted to atmosphere. The particular motor A illustrated in Fig. 1 of the drawings is of typical form and design and involves, generally, a case 20 carrying the essential working parts. A chuck 21 is provided at the forward end of the motor to be operated by the shaft of the motor and may be employed to carry a suitable tool T. In a typical situation the tool may be a drill. The motor case 20 is shown provided at its inner end with an air inlet opening 23 and at its forward end portion it is provided with suitable air exhaust ducts 24.

The fluid pressure actuated means B carrying the motor 20 preferably involves, generally, a cylinder 25 closed at its forward end by a head 26, and at its rear end by a head 27. A piston 28 operates in the cylinder and a stem 29 is attached to or carries the piston and projects through the forward head 26. The stem is preferably tubular in form and the motor 20 is carried in the forward end portion of the stem.

The means C is a holding means operating to hold the motor 20, or the stem 29 which supports the motor, against rotation, without interfering with the desired reciprocation of the motor. The means C, as shown in the drawings, involves a clamp or collar 33 engaged around the projecting end portion 34 of the stem and a head 35 carried by the collar and extending parallel with the stem and slidably engaged in a guide 36. The clamp collar 33 is a split collar adapted to be tightened by a screw clamp 37 and it engages around the split portion of the stem 29 so that the stem can be tightened onto the motor and thereby grip it. The head 35 is an elongate element rigid with the collar and extending parallel with the stem to operate in the guide 36.

The means D supplying operating fluid to the means B selectively delivers operating fluid such as air under pressure to the ends of cylinder 25. In the form of the invention illustrated in the drawings the means D involves a valve 40 controlling the distribution of operating fluid and ducts 41 and 42 controlling the air controlled by the valve. The valve 40 is shown as including a suitable case or body 43 and a shiftable valve element 44 in the case. Duct 41 extends from the case 43 to the end of cylinder 25 adjacent head 26 and the duct 42 extends from the case 43 to the cylinder 25 adjacent head 27. When the valve element 44 is in one position operating fluid enters the cylinder 25 between the head 27 and the piston 28 and causes the stem which carries the motor to move outwardly. During this operation pressure is exhausted from the other end of the cylinder through the duct 41. When pressure is admitted to duct 41 it is introduced into the cylinder 25 between the head 26 and the piston 28 and causes return or inward movement of the stem which carries the motor. During the return operation pressure is exhausted through duct 42.

The means D, best shown in Fig. 7 of the drawings, supplies operating fluid, for instance, air under pressure to the motor 20, and in accordance with the present invention the operating fluid is supplied from one end or the other of the cylinder 25. The means D considered broadly involves one or more check valves passing operating fluid through the piston 28.

In the particular construction illustrated the piston 28 is fixed on the inner end of stem 29 and includes a body 50 fixed to the stem and having a socket 51 entering it from the end which opposes cylinder head 27. Suitable sealing means such as rings 52 are carried on the exterior of the body 50 and seal with the cylinder 25. A plate 54 is attached to the body 50 and closes the socket 51 so that a valve chest is established within the piston. A duct 55 extends from the middle portion of the valve chest to the end of the piston body opposing cylinder head 26 and it opens into the cylinder. A fluid passage 56 is provided, preferably in plate 54, connecting the valve chest with the space in cylinder 25 occurring between the piston and the head 27, while a fluid passage 57 is provided, preferably in the cylinder body, connecting the valve chest with the space in the cylinder 25 between the piston and the head 26. Suitable check valves are provided in the valve chest, one serving to admit fluid under pressure from the passage 56 and the other serving to admit fluid under pressure from the passage 57, and both acting to prevent escape of pressure from the valve chest through either of the said passages. In the particular case illustrated the piston is provided with a central core 58 that extends through the valve chest, and each of the aforementioned check valves is in the form of a ring 60 mounted in the valve chest to surround the core and having a lip 61 cooperatively engaging the exterior of the core. A spring 66 in the valve chest between the valve rings holds the rings apart or at opposite ends of the valve chest, and it will be noted that the rings are arranged so that the lips oppose each other or face inwardly and thus have the desired check valve action. A suitable stop means may be provided in connection with either one of the passages passing fluid from the valve chest that occurs within the piston. In the case illustrated a stop means in the form of a removable plug 68 is provided for the passage 57. The plug 68 can be readily removed when desired, through a normally plugged access opening 69 in the cylinder. When the plug 68 is in place the structure operates so that the motor is driven only when pressure is introduced to the cylinder 25 in a manner to feed or advance the motor toward the work. As the motor is returned the motor driving fluid is cut off from the motor. If it is desired that the motor should operate when it is moved in either direction then the plug 67 is removed, leaving the passage-way 57 open and unrestricted.

The speed control E is shown as involving a cylinder 70 carrying a piston 71, and a piston rod 72 carries the piston 71 and connects with the piston 28. The rod 72 is shown engaged through the core 58 and is threaded to the piston 28 at 73. The piston 71 operates in the cylinder 70 and on the rod 72 so that it closes communication between the two ends of the cylinder 70 when the rod is operated in the direction indicated by the arrow in Fig. 8. When the rod operates in the opposite direction a passage-way 75, provided through the piston 71, is open so that fluid can pass between the ends of the cylinders by flowing through the piston. To effect the action just described the piston is slidable on the rod and is confined for limited movement between stop flanges 76 and 77. A spring 78 normally yieldingly holds the piston in the first named position.

A by-pass duct 79 connects the ends of cylinder 70 so that when fluid passage is stopped through the piston 71 fluid can flow through the by-pass under control of a valve mechanism 80. The valve mechanism 80, which may be as shown in Fig. 5 of the drawings, includes a throttle valve 81 operated by a stem 82 and a relief means serving to pass fluid without its going through the throttle valve. The means E is related to the means B so that when the motor A is being advanced or fed toward work its speed of advance is governed by the setting of the throttle valve 81. The relief means in the valve mechanism 80 is provided so that the speed control can be relaxed allowing the motor to be advanced rapidly. The relief means as shown in the drawings involves a passage 84 connected around the throttle valve 81 and a reciprocating valve 85 controls flow through the passage 84. In the case illustrated the valve 85 is operated by a piston 86 carried in a cylinder 87. A spring 88 normally holds the piston 86 in the position where the valve 85 is open. However, when pressure is applied through a pressure supply line 88ª the piston 86 is operated to a position where the valve 85 is closed. A bleed opening 89 is provided so that when pressure from line 88ª is cut off pressure bleeds from the piston 86 allowing the valve 85 to be opened by the action of the spring 88.

In the form of the invention illustrated an accumulator F is provided in connection with the hydraulic system just described and includes a cylindrical reservoir 90 carrying a supply of fluid connected with the hydraulic system by a duct 91. A piston 92 operating in the cylinder 90 is held in pressure engagement with the fluid by a spring 93.

The control means G involves, generally, electrical operating means such as coils 100 and 101 for operating the valve element 44 and an electrical element such as a coil 102 for operating a valve 103 that controls flow of fluid under pressure to the line 88ª that connects to the valve mechanism 80. The operating coils 100, 101 and 102 are under control of switches 105, 106 and 107, respectively, which are suitably incorporated in a control circuit, as shown in the diagram, Fig. 9. In a preferred arrangement the switches 105, 106 and 107 are carried by or at the guide 36 and cams 110 and 111 are provided on the head 35 to operate switches 106 and 107, respectively. The cams 110 and 111 are slidable in channels 112 in the head 35 and are set in the desired adjusted positions by set screws 113. The switch 105 is shown as a manually operated switch which may be termed a starting switch and serves to initiate a cycle of operation when closed. This switch is shown mounted on the guide or in the switch assembly that is carried by the guide so that it is in a position convenient for the operator of the machine.

An additional switch, namely, a trip switch 120, is mounted on or carried by the guide 36 and is adapted to be actuated by a pivoted trip arm 121 carried by the head 35. The trip arm 121 is normally yieldingly held by a spring 122 so that it will trip past switch 120 without operating it as the mechanism is operated to feed or advance the motor A, whereas it catches and operates the switch 120 as the mechanism is being reversed or returned to an unactuated position. In a preferred arrangement the trip switch 14 incorporated in the unit X is connected in parallel with the starter switch 105 of unit Y so that when unit X reaches a predetermined position the unit Y is started in operation. The trip switch 120 of unit Y is operated as the unit Y returns to its unactuated position and is connected with unit B to then initiate operation of the unit Z. The trip switch 120 of unit Z is operated as unit Z completes its cycle of operation and is connected with unit X to effect a predetermined operation thereof.

With a valve mechanism 80 in the speed control having a valve 85 normally open the means B, when operated, will advance the motor A without the action being retarded or slowed down. Such unrelated movement is generally desired as the tool T is moved up to the work. However, as the tool reaches the work and as it is engaged with the work it is preferred that the rate of feed be controlled or retarded. With the mechanism that I have provided the cam 111 can be so set or adjusted as to operate switch 107 when the tool is in the desired position relative to the work, causing coil 102 to be energized so that valve 103 is operated to pass fluid under pressure to line 88ª. The fluid under pressure from line 88ª operates piston 86 causing valve 85 to close. When valve 85 is closed the fluid being bypassed through the by-pass 79 must all pass the throttle valve 81, the setting of which will determine the speed at which the motor A is advanced.

From the foregoing description it will be apparent that I have provided a throttle wherein an air operated tool driving motor is so carried by a mounting or feeding mechanism that the fluid employed in that feeding mechanism is utilized for the driving of the motor. It will be apparent that with my structure the motor can be driven only as the feed is operated to advance the motor or it can be operated while the motor is advanced and also while the motor is being retracted. It will be further apparent that through the speed control that I have provided the motor retracts without being impeded, whereas its advance can be retarded as desired, or can be freed for a portion of the movement, as circumstances may require.

Having described only a typical preferred form and application of my invention, I do not wish to be limited or restricted to the specific details herein set forth, but wish to reserve to myself any variations or modifications that may appear to those skilled in the art and fall within the scope of the following claim:

Having described my invention, I claim:

1. In combination, a tool driving motor, a fluid pressure operated means supporting the motor for reciprocation, and including a cylinder, a piston in the cylinder, and a stem extending from the piston and carrying the motor, means selectively supplying operating fluid to the ends of the cylinder to operate the piston therein, and means supplying operating fluid to the motor from one end of the cylinder including a check valve controlling a fluid passage through the piston.

2. In combination, a tool driving motor, a fluid pressure operated means supporting the motor for reciprocation, and including a cylinder, a piston in the cylinder, and a stem extending from the piston and carrying the motor, means selectively supplying operating fluid to the ends of the cylinder to operate the piston therein, and means supplying operating fluid to the motor including passageways in the piston passing operating fluid from the two sides of the piston to enter the motor and check valves controlling flow through the passageways.

3. In combination, a tool driving motor, a fluid pressure operated means supporting the motor for reciprocation, and including a cylinder, a piston in the cylinder, and a stem extending from the piston and carrying the motor, means selectively supplying operating fluid to the ends of the cylinder to operate the piston therein, and means supplying operating fluid to the motor including a chest in the piston in communication with the motor, passageways in the piston from the ends thereof to the chest, and inwardly opening check valves in the passageways.

4. In combination, a tool driving motor, a fluid pressure operated means supporting the motor for reciprocation, and including a cylinder, a piston in the cylinder, and a tubular stem extending from the piston and carrying the motor, means selectively supplying operating fluid to the ends of the cylinder to operate the piston therein, and means supplying operating fluid to the stem to operate the motor from one end of the cylinder including a check valve controlling a fluid passage through the piston.

5. In combination, a tool driving motor, a fluid pressure operated means supporting the motor for reciprocation, and including a cylinder, a piston in the cylinder, and a stem extending from the piston and carrying the motor, means selectively supplying operating fluid to the ends of the cylinder to operate the piston therein, and means supplying operating fluid to the motor including a chest in the piston and in communication with the motor, a core in the chest, a passageway in the piston from one end thereof to the chest, and a check valve controlling flow through the passageway including a ring in the chest with a flow checking lip engaging and surrounding the core.

6. In combination, a tool driving motor, a fluid pressure operated means supporting the motor for reciprocation, and including a cylinder, a piston in the cylinder, and a stem extending from the piston and carrying the motor, means selectively supplying operating fluid to the ends of the cylinder to operate the piston therein, and means supplying operating fluid to the motor including a chest in the piston and in communication with the motor, a core in the chest, passageways extending from the chest to the ends of the piston, and rings in the chest controlling flow through the passageways, the rings having opposed sealing lips engaging the core.

7. In combination, a tool driving motor, a fluid pressure operated means supporting the motor for reciprocation, and including a cylinder, a piston in the cylinder, and a stem extending from the piston and carrying the motor, means holding the stem against rotation, means selectively supplying operating fluid to the ends of the cylinder to operate the piston therein, and means supplying operating fluid to the motor from one end of the cylinder including a check valve controlling a fluid passage through the piston.

8. In combination, a cylinder, a piston operating in the cylinder, a tubular stem projecting from the piston and beyond one end of the cylinder, a fluid operated motor carried by the stem with its intake open to the stem, means selectively supplying operating fluid under pressure to the ends of the cylinder to act upon the piston, and means passing operating fluid from one end of the cylinder to the stem including a check valve permitting flow in one direction only.

9. In combination, a cylinder, a piston operating in the cylinder, a tubular stem projecting from the piston and beyond one end of the cylinder, a fluid operated motor carried by the stem with its intake open to the stem, means holding the stem against rotation, means selectively supplying operating fluid under pressure to the ends of the cylinder to act upon the piston, and means passing operating fluid from one end of the cylinder to the stem including a check valve permitting flow in one direction only.

10. In combination, a cylinder, a piston operating in the cylinder, a tubular stem projecting from the piston and beyond one end of the cylinder, a fluid operated motor carried by the stem with its intake open to the stem, means selectively supplying operating fluid under pressure to the ends of the cylinder to act upon the piston, means passing operating fluid from one end of the cylinder to the stem including a check valve permitting flow in one direction only, and speed control means governing movement of the motor.

11. In combination, a cylinder, a piston operating in the cylinder, a tubular stem projecting from the piston and beyond one end of the cylinder, a fluid operated motor carried by the stem with its intake open to the stem, means selectively supplying operating fluid under pressure to the ends of the cylinder to act upon the piston, means passing operating fluid from one end of the cylinder to the stem including a check valve permitting flow in one direction only, speed control means governing movement of the motor and including an electrically controlled release means, and a switch governing the release means and responsive to the position of the stem.

12. In combination, a cylinder, a piston operating in the cylinder, a tubular stem projecting from the piston and beyond one end of the cylinder, a fluid operated motor carried by the stem with its intake open to the stem, means selectively supplying operating fluid under pressure to the ends of the cylinder to act upon the piston, means passing operating fluid from one end of the cylinder to the stem including a check valve permitting flow in one direction only, speed control means governing movement of the motor and including a fluid bypass and an electrically controlled release means for the bypass, and a switch governing the release means and responsive to the positioning of the stem.

13. In combination, a cylinder, a piston operating in the cylinder, a tubular stem projecting from the piston and beyond one end of the cylinder, a fluid operated motor carried by the stem with its intake open to the stem, means selectively supplying operating fluid under pressure to the ends of the cylinder to act upon the piston, and means passing operating fluid from one end of the cylinder to the stem including a check valve permitting flow in one direction only, the first mentioned means including electrically controlled valve means responsive to the positioning of the stem.

14. In combination, a cylinder, a piston operating in the cylinder, a tubular stem projecting from the piston and beyond one end of the cylinder, a fluid operated motor carried by the stem with its intake open to the stem, means holding the stem against rotation including a head rigid with the stem and a guide engaged by the heads, means selectively supplying operating fluid under pressure to the ends of the cylinder to act upon the piston, means passing operating fluid from one end of the cylinder to the stem including a check valve permitting flow in one direction only, speed control means governing movement of the motor and including an electrically controlled release means, and a switch governing the release means and responsive to the position of the stem, the switch being operated by an element on the guide.

15. In combination, a cylinder, a piston operating in the cylinder, a tubular stem projecting from the piston and beyond one end of the cylinder, a fluid operated motor carried by the stem with its intake open to the stem, means holding the stem against rotation including a head rigid with the stem and a guide engaged by the head, means selectively supplying operating fluid under pressure to the ends of the cylinder to act upon the piston, means passing operating fluid from one end of the cylinder to the stem including a check valve permitting flow in one direction only, speed control means governing movement of the motor and including an electrically controlled release means, a switch governing the release means, and a cam on the head operating the switch.

16. In combination, a cylinder, a piston operating in the cylinder, a tubular stem projecting from the piston and beyond one end of the cylinder, a fluid operated motor carried by the stem with its intake open to the stem, means holding the stem against rotation including a head rigid with the stem and a guide engaged by the head, a trip switch operated by the head to operate a control circuit, means selectively supplying operating fluid under pressure to the ends of the cylinder to act upon the piston, and means passing operating fluid from one end of the cylinder to the stem including a check valve permitting flow in one direction only, the switch being operated by an element on the guide.

NEIL V. SMITH.

REFERENCES CITED

The following references are of record in the file of this patent:

UNITED STATES PATENTS

| Number | Name | Date |
|---|---|---|
| 694,981 | McGrath | Mar. 11, 1902 |
| 2,406,482 | Tucker | Aug. 27, 1946 |
| 2,459,902 | Tucker | Jan. 25, 1949 |
| 2,488,992 | Taylor | Nov. 22, 1949 |

FOREIGN PATENTS

| Number | Country | Date |
|---|---|---|
| 198,473 | Great Britain | June 7, 1923 |